US010423382B2

United States Patent
De Angelis et al.

(10) Patent No.: US 10,423,382 B2
(45) Date of Patent: Sep. 24, 2019

(54) TELECONFERENCE RECORDING MANAGEMENT SYSTEM

(71) Applicant: International Business Machines Corporation, Armonk, NY (US)

(72) Inventors: Fabio De Angelis, Rome (IT); Luca Balestrazzi, Rome (IT); Andrea Napoleoni, Arsoli (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 15/839,173

(22) Filed: Dec. 12, 2017

(65) Prior Publication Data

US 2019/0179595 A1  Jun. 13, 2019

(51) Int. Cl.
| | |
|---|---|
| *G06F 3/16* | (2006.01) |
| *G10L 15/26* | (2006.01) |
| *G06F 16/638* | (2019.01) |
| *H04L 29/06* | (2006.01) |
| *H04L 29/08* | (2006.01) |

(52) U.S. Cl.
CPC .............. *G06F 3/16* (2013.01); *G06F 16/639* (2019.01); *G10L 15/265* (2013.01); *H04L 65/403* (2013.01); *H04L 67/12* (2013.01)

(58) Field of Classification Search
CPC .............. G06F 3/16; G06F 17/30; G10L 15/26
USPC .......... 700/94; 348/14.01–14.16; 379/202.01
See application file for complete search history.

(56) References Cited

U.S. PATENT DOCUMENTS

| | | | |
|---|---|---|---|
| 8,754,926 B1* | 6/2014 | Gossweiler | H04L 12/1827 348/14.08 |
| 8,826,242 B2* | 9/2014 | Livshits | G06F 11/3419 717/130 |
| 2011/0270609 A1 | 11/2011 | Jones et al. | |
| 2013/0018656 A1 | 1/2013 | White | |
| 2014/0200888 A1* | 7/2014 | Liu | G10L 15/26 704/235 |
| 2015/0106091 A1 | 4/2015 | Wetjen | |

(Continued)

FOREIGN PATENT DOCUMENTS

WO    2014085985 A1    6/2014

OTHER PUBLICATIONS

List of IBM Patents or Patent Applications Treated as Related, May 3, 2018.

(Continued)

*Primary Examiner* — Melur Ramakrishnaiah

(57) ABSTRACT

An example operation may include one or more of generating a local audio file comprising audio captured of a user participating in a teleconference, receiving one or more other local audio files of the teleconference captured by one or more other audio devices that participated in the teleconference, determining a synchronized playback order for audio portions of the generated local audio file and audio portions of the one or more received local audio files based on timing information included in the generated local audio file and the received timing information, and outputting a playback of the audio portions of the generated local audio file and the detected audio portions of the one or more received local audio files synchronized together based on the determined synchronized playback order.

20 Claims, 9 Drawing Sheets

(56) References Cited

U.S. PATENT DOCUMENTS

2015/0156318 A1* 6/2015 Kaplan ................ H04M 1/656
 379/85
2017/0061973 A1* 3/2017 Baier ................... G11B 27/034

OTHER PUBLICATIONS

Fabio De Angelis, Teleconference Recording Management System, U.S. Appl. No. 15/839,046, filed Dec. 12, 2017.

* cited by examiner

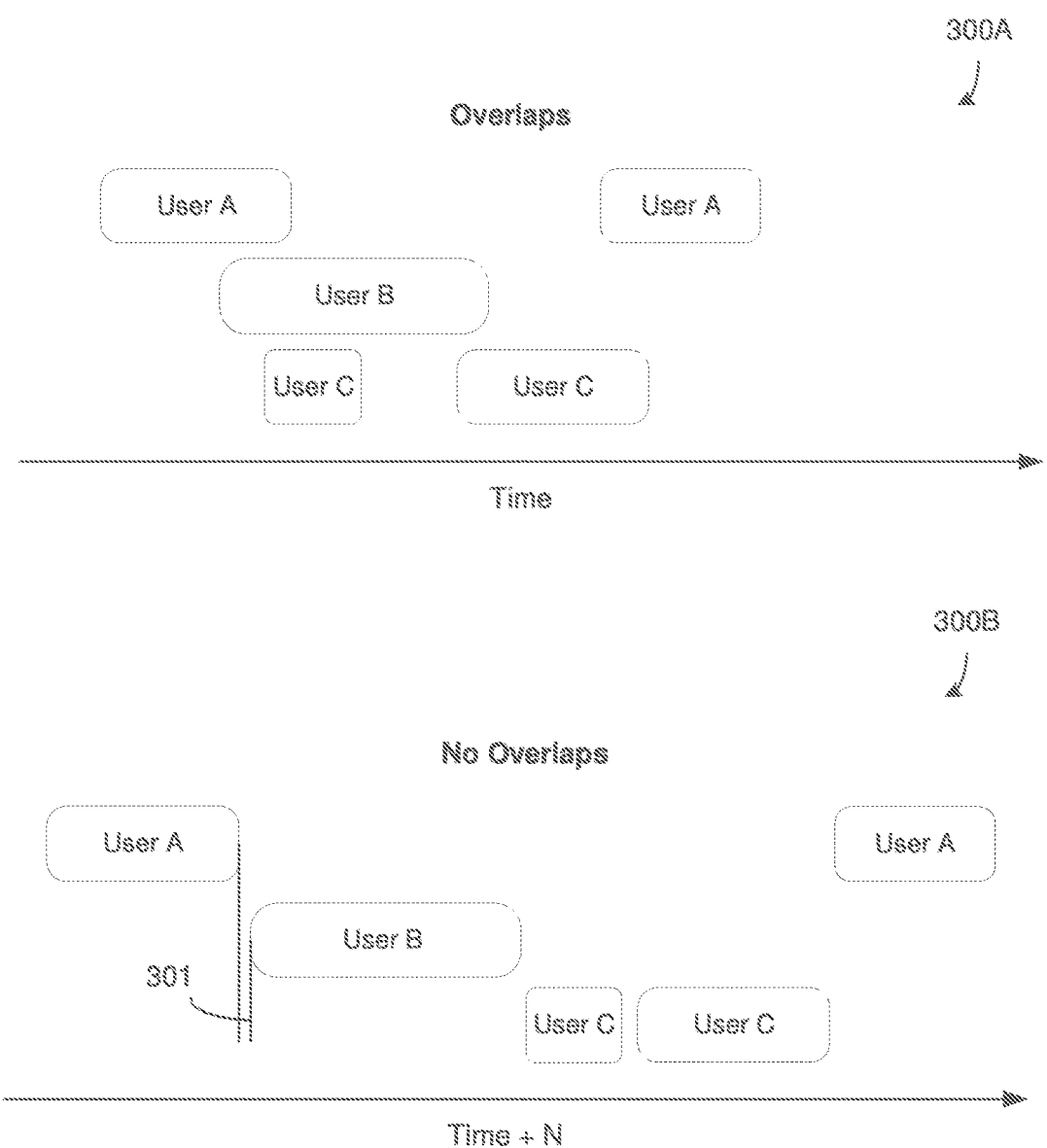

FIG. 4

| Conversation ID | User Id | Server Time | Device Time | Audio File | Text |
|---|---|---|---|---|---|
| 001 | User A | 6139313456310202016 | 5609233456102202016 | Blob | Clob |
| 001 | User B | 3179833456104202016 | 8043334561020202016 | Blob | Clob |
| 001 | User C | 3475933456102202016 | 1246783456102202016 | Blob | Clob |
| 002 | User A | 9024334561402202016 | 5567863456102202016 | Blob | Clob |

410 ⟶ 411 ⟶ 412 ⟶

| Word Id | Count | Word | String | Audio file |
|---|---|---|---|---|
| 0001 | 1 | delivered | The package will be delivered on Monday.... | 1003.avi |
| 0002 | 4 | deliver | We need to deliver it as soon as possible. | 1055.avi |
| 0003 | 2 | delivery | The delivery is expected to arrive on Wednesday. | 1058.avi |
| 0004 | 2 | Delivery | The delivery carrier is UPS and.... | 1256.avi |

420 ⟶ 421 ⟶ 422 ⟶

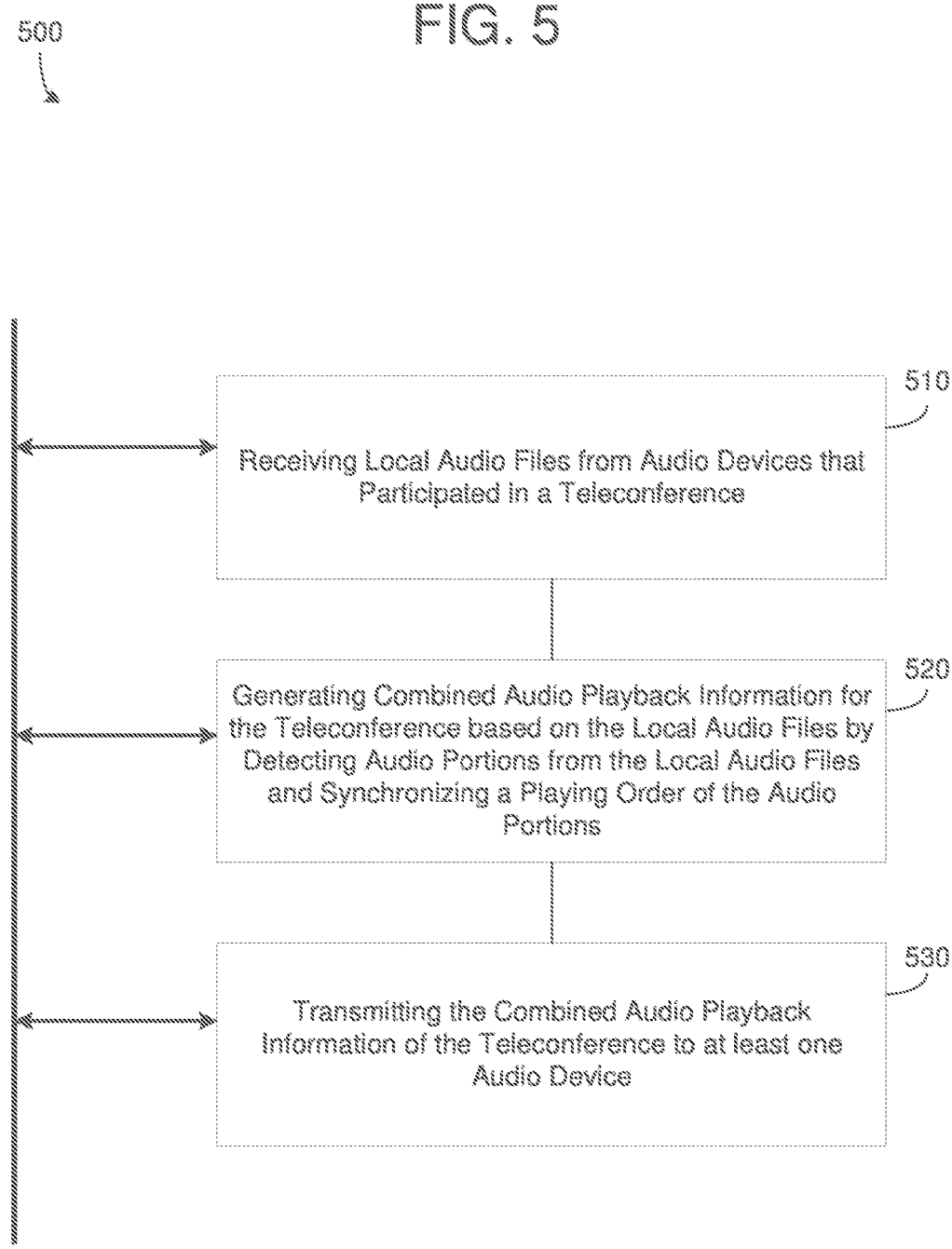

TELECONFERENCE RECORDING MANAGEMENT SYSTEM

TECHNICAL FIELD

This application generally relates to a teleconference management system and more particularly, to a teleconference recording management system.

BACKGROUND

Current telecommunication systems support teleconferencing (live telephone exchange) by providing services such as audio, video, and data to participants during a live telephone call. Meanwhile, Internet teleconferencing (live web exchange) includes internet telephone, videoconferencing, web conferencing, and even augmented reality conferencing, and provides participants with the same services via the Internet. During a teleconference, participants are linked together by a telecommunication system and are able to perform a live exchange of spoken conversation and data sharing. Participants are often communicating with one another through telephones, computers, headsets, mobile devices, appliances (televisions), and the like.

However, access to teleconference information after the teleconference has been performed is very limited. Often, a participant must record the teleconference from their own perspective (i.e., user device) which can limit the call quality and clarity. For example, the user device is only capturing the live speech of the person who is using that device while other users involved in the teleconference are being heard through the telecommunication network which can create noise, static, loss of quality, and the like. As a result, the recorded teleconference can have audio that is poor in quality. Furthermore, when multiple users participate in a teleconference, significant speech overlap can occur when multiple users speak at the same time. As a result, parts of the teleconference can be unintelligible. Accordingly, what is needed is a system that can improve teleconference call quality and simplify collaboration between participants.

SUMMARY

In one example embodiment, provided is a computing system that includes one or more of a network interface to receive a plurality of local audio files from a plurality of audio devices that participated in a teleconference, where each local audio file includes a locally captured audio recording of a user of a respective audio device during the teleconference, and a processor to generate combined audio playback information for the teleconference based on the plurality of local audio files received from the plurality of audio devices by detecting audio portions within the plurality of local audio files and synchronizing a playing order of the detected audio portions based on timing information included in the plurality of local audio files, and the processor may further control the network interface to transmit the combined audio playback information of the teleconference to at least one audio device among the plurality of audio devices.

In another example embodiment, provided is a computer-implemented method that includes one or more of receiving a plurality of local audio files from a plurality of audio devices that participated in a teleconference, where each local audio file includes a locally captured audio recording of a user of a respective audio device during the teleconference, generating combined audio playback information for the teleconference based on the plurality of local audio files received from the plurality of audio devices, the generating including detecting audio portions within the plurality of local audio files and synchronizing a playing order of the detected audio portions based on timing information included in the plurality of local audio files, and transmitting the combined audio playback information of the teleconference to an audio device among the plurality of audio devices.

In another example embodiment, provided is a non-transitory computer readable medium having stored therein program instructions that when executed cause a computer to perform one or more of receiving a plurality of local audio files from a plurality of audio devices that participated in a teleconference, where each local audio file includes a locally captured audio recording of a user of a respective audio device during the teleconference, generating combined audio playback information for the teleconference based on the plurality of local audio files received from the plurality of audio devices, the generating including detecting audio portions within the plurality of local audio files and synchronizing a playing order of the detected audio portions based on timing information included in the plurality of local audio files, and transmitting the combined audio playback information of the teleconference to an audio device among the plurality of audio devices.

In another example embodiment, provided is a computing system that includes one or more of a processor configured to generate a local audio file including audio captured of a user of an audio device while participating in a teleconference, and a network interface configured to receive one or more other local audio files of the teleconference captured by one or more other audio devices that participated in the teleconference, each received local audio file comprising detected audio portions and timing information of the detected audio portions, wherein the processor is further configured to determine a synchronized playback order for audio portions of the generated local audio file and the detected audio portions of the one or more received local audio files based on timing information included in the generated local audio file and the received timing information, and output a playback of the audio portions of the generated local audio file and the detected audio portions of the one or more received local audio files synchronized together based on the determined synchronized playback order.

In another example embodiment, provided is a computer-implemented method that includes one or more of generating a local audio file including audio captured of a user of an audio device while participating in a teleconference, receiving one or more other local audio files of the teleconference captured by one or more other audio devices that participated in the teleconference, each received local audio file including detected audio portions and timing information of the detected audio portions, determining a synchronized playback order for audio portions of the generated local audio file and the detected audio portions of the one or more received local audio files based on timing information included in the generated local audio file and the received timing information, and outputting, via the audio device, a playback of the audio portions of the generated local audio file and the detected audio portions of the one or more received local audio files synchronized together based on the determined synchronized playback order.

In another example embodiment, provided is a non-transitory computer readable medium having stored therein program instructions that when executed cause a computer to perform one or more of generating a local audio file including audio captured of a user of an audio device while participating in a teleconference, receiving one or more other local audio files of the teleconference captured by one or more other audio devices that participated in the teleconference, each received local audio file including detected audio portions and timing information of the detected audio portions, determining a synchronized playback order for audio portions of the generated local audio file and the detected audio portions of the one or more received local audio files based on timing information included in the generated local audio file and the received timing information, and outputting, via the audio device, a playback of the audio portions of the generated local audio file and the detected audio portions of the one or more received local audio files synchronized together based on the determined synchronized playback order.

Other features and modifications may be apparent from the following description when taken in conjunction with the drawings and the claims.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

FIG. 3A is a diagram illustrating a process of modifying overlapping audio from a teleconference in accordance with an example embodiment.

FIG. 4 is a diagram illustrating teleconference information stored in a database in accordance with an example embodiment.

FIG. 5 is a diagram illustrating a method of generating audio playback information for a teleconference in accordance with an example embodiment.

DETAILED DESCRIPTION

Figure 1:
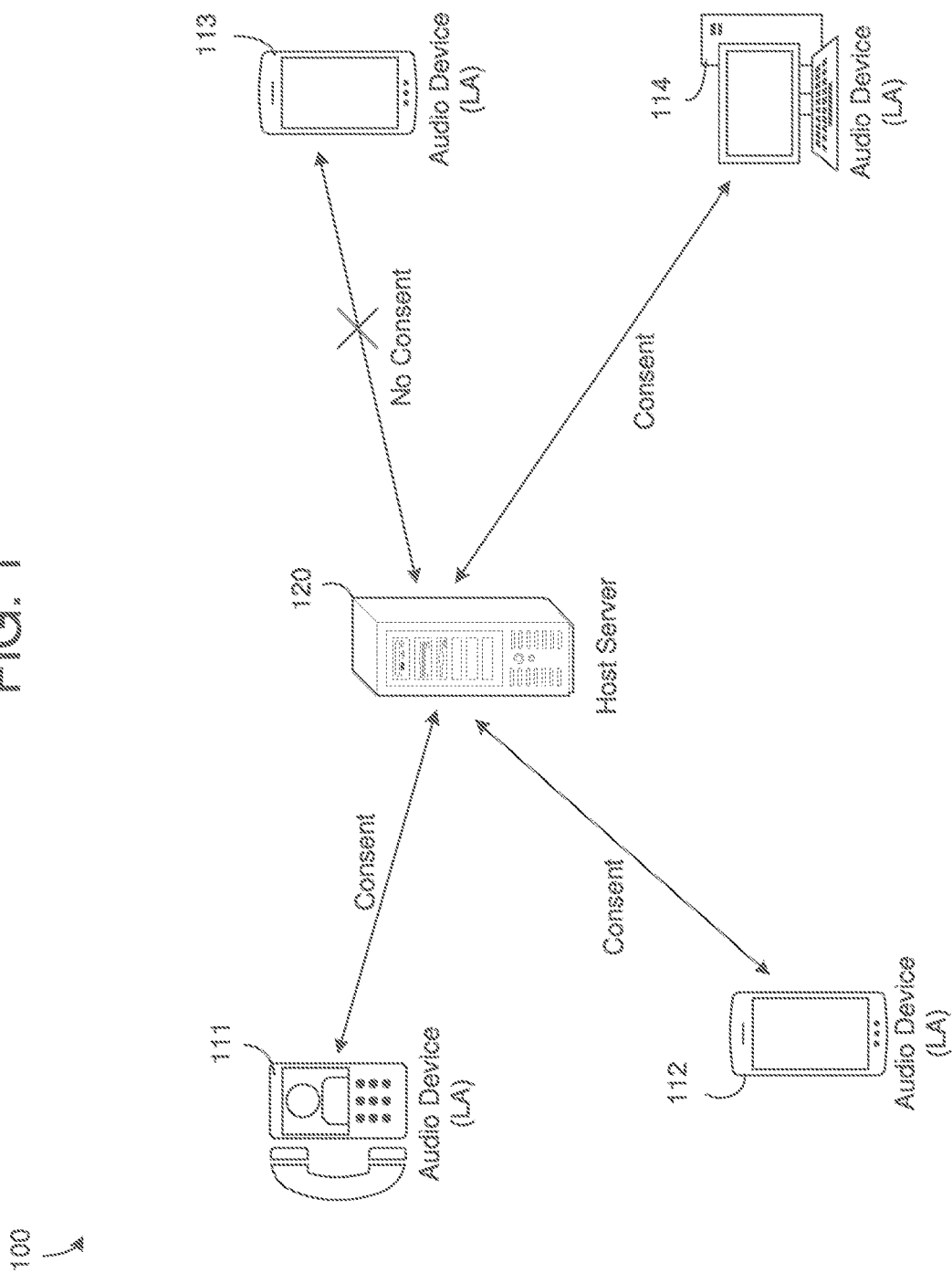
FIG. 1 is a diagram illustrating a teleconference recording system in accordance with an example embodiment.

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner throughout the embodiments. In addition, the usage of the phrases such as "example embodiments", "some embodiments", or other similar language, throughout this specification is used to indicate that a particular feature, structure, or characteristic described in connection with the embodiment may be included in the at least one embodiment and is not to be construed as being omitted from other embodiments. Thus, appearances of the phrases "example embodiments", "in some embodiments", "in other embodiments", or other similar language, may be used to refer to the same group of embodiments, and the described features, structures, or characteristics may be combined in any suitable manner in one or more embodiments.

In addition, while the term "message" may be used in the description of embodiments, the application may be applied to many types of network data, such as, packet, frame, datagram, etc. The term "message" or "request" may include packet, frame, datagram, and any equivalents thereof. Furthermore, while certain types of messages and signaling requests may be depicted in example embodiments they are not limited to a certain type of message, and the application is not limited to a certain type of signaling.

The instant application in one embodiment relates to a collaborative teleconference management system, and in another embodiment relates to a system that manages the generation of a teleconference recording based on local audio recordings from different participant audio perspectives. Each audio device (e.g., smartphone, computer/headset, tablet, video phone, television, etc.) participating in the teleconference may have a local agent installed which records speech of a local user only during the teleconference. For example, the local agent may filter out speech and noise from other users included in the teleconference and record only the audio provided by the person or persons who are using that local device.

Users may choose/authorize whether to participate in a combined conference call recording by sharing their local audio file. For users who have authorized such participation, the local agent can transmit an audio recording (e.g., audio file) of the local audio, identification information, and speech timing information to a host server. For users that do not consent to sharing their audio recording, the local agent can transmit identification information and timing information but not provide the audio recording to the host server. The host server may receive the local audio files and the timing information from all participants and generate a combined audio playback order for audio segments of the local audio files in chronological order. For users who do not upload the audio recordings, the timing information can be used by the host server to leave blanks or muted spaces of speech where that user was speaking, or the host server can simply remove those audio segments from the teleconference and shorten the overall time of the teleconference. In other words, the host server can order the teleconference audio chronologically based on the timing information even though the audio recording is not received.

The system provides a capability to capture and identify clean conversations of a teleconference from local agents executing on audio devices and a central server that can generate a combined audio playback for the teleconference based on the locally captured audio. Leveraging the proposed system, the voice/speech of each participant may be recorded locally by the participant's device which is able to recognize the participant's (e.g., owner's) voice and filter out the rest. The central host server may receive the local audio files which include timing information and generate a combined audio playback order for the conversation that was conducted during the group teleconference based on the timing information.

To generate the playback, the host server may use the local audio files of each user uploaded to the server, and create a combined audio playback information which includes sections of audio to play from each of the local audio files and times at which to playback the sections of audio such that the teleconference is free of voice overlap and line noise. Accordingly, the central server may transmit the combined audio playback information and the local audio files to a user device that desires to listen to the teleconference. A user device may receive the local audio files of other users and the combined playback order, and recreate the teleconference during an audio playback. The system also offers a reliable and efficient way to translate the conversation into text. For example, the server may match each participant to each audio file, and create clean audio files for the voice-to-text translation software.

Furthermore, because the speech management may be performed at a client's device, the system provides the individual user of the teleconference the capability to manage both the recording consent and denial of consent, filter out specific users from the teleconference, and perform speech analysis. When a user/participant of the teleconference does not want their audio shared with the central server, the user may select a denial of consent. The denial of consent, however, does not preclude the user from participating in the recorded conversation because, for every participant to the conference, the local agent operating on the device will record only a local participant's voice. When the teleconference has ended, the single participant's speech may be uploaded to the server if that user gave consent, otherwise the audio file will be stored only locally on the user's device. For users that do not share their audio, the local agent still uploads identification information of the user and timing information of the user's audio provided during the teleconference thereby enabling the host server to generate a chronological ordering of audio segments of all users even those users that do not upload their audio recordings. The host server queues audio segments from the plurality of local audio files in chronological order. When the host server encounters a missing audio segment (based on the timing information from a non-consenting user) the host server may skip over the non-received audio segment and queue a next audio segment thereafter such that no gaps occur when playing back the audio.

Every teleconference participant has the option to hear the complete conversation (with all voices in sync) including all the participants that gave recording permission. The same functionality is allowed to those users who didn't give consent for recording however their audio is not provided to the other users. In this scenario, the recorded audio of that user hasn't been uploaded to central server but is stored locally on device. This allows the local agent operating on the audio device to receive the local audio files shared with the central server and to playback the teleconference by incorporating the locally generated audio file that was not shared with the central server. Accordingly, the user that did not consent to sharing their audio can playback the teleconference with all participants that gave permission in sync with the user's local audio file. Furthermore, by controlling playback at the local agent, a user can selectively turn ON/OFF users that participated in the teleconference by simple selection of the user. This can be beneficial when two or more users are talking at the same time or more detailed analysis of a particular user's speech is desired. The user can turn one or more users off until the conversation becomes clear.

Some of the advantages provided by the system include that a participant's denial for recording doesn't stop the call recording or doesn't stop the user's ability to participate in the call. In this case, the participant to the conference that didn't give recording permission, can playback the teleconference audio session with audio from all participants that gave permission for recording and the local agent on the user's device can add the local audio in sync with the locally generated unshared audio stored locally. Furthermore, the participant to the call that didn't give recording permission can change the decision later in time (after call is ended), allowing the automatic upload to the host server making it available to all other participants. If it's not defined at the beginning of the conversation there is not a limited number for recording denials.

Another advantage is that at playback time, the local agent allows each user the ability to switch on/off selectively the audio of every participant, making it possible to understand clearly conversation where voices overlap or to understand better participant mood, which can be further helped by speech analysis provided by host server. The system is also efficient in voice to text translation being performed on each audio of each participant, instead of translating from a single audio file containing the entire conversation. Speech analysis can be performed for each user rather than the teleconference as a whole because each audio file of each user may be generated and stored singularly. Furthermore, the server is capable of generating audio playback information (e.g., queued speech segments) from the local audio files such that there is no overlap between each speech segment of the teleconference making the audio significantly clear.

FIG. 1 illustrates a teleconference recording system 100 in accordance with an example embodiment. Referring to FIG. 1, the system 100 includes a host server 120, and a plurality of audio devices 111, 112, 113, and 114. System setup starts with user registration to the host server 120. Each audio device 111-114 may install a local agent (LA) on the audio device. Here, the audio devices 111-114 may be smartphones, computers, tablets, kiosk's, video phones, televisions, appliances, and the like. In one embodiment, the installation of the local agent, can be offered by the server at registration time. After the local agents have been installed, a teleconference may be conducted between the audio devices 111-114 via a network such as a cellular, telephone, data/internet, etc. During the teleconference, each voice is recorded on the local device, thus each user voice is clearer. Single recording of user's voice then provides the capability of playback the entire conversation avoiding voice overlaps as further described herein. That is, rather than record the teleconference at the central server, each user device/headset has a local agent that records only the local conversation of that particular user and stores the recording as a file on that local device. The local agent can further filter/remove speech and noise from other users other than the local user.

At the end of the teleconference (or some other period of time), the local agents that have received consent/approval to upload the local audio file may do so to the host server 120. The uploaded information may include a user ID, a teleconference ID, timestamp information indicating sections of audio of that user, a local audio file, etc. However, in this example, the audio device 113 does not upload/share the local audio file of that particular user but instead keeps it stored internally. In this case, the audio device 113 may transmit other data from the teleconference such as identification information (e.g., user ID, teleconference ID) and timing information (e.g., start and stop times of audio segments from the non-consenting user) to the host server 120 except for the audio recording. The host server 120 receives the timing information of the audio from all users and generates playback information for the teleconference by merging audio segments from each of the local audio files based on a chronological order.

For example, the host server 120 can queue the voice records from different users in the correct sequence without overlaps. The host server 120 may order voice records/segments using the timestamp linked to each record. When the host server 120 encounters an audio segment of a non-consenting user based on the received timing information, the host server 120 may skip over or ignore the audio segment when generating the playback information and queue the previous audio segment and the next audio segment back-to-back. If the user selects the option to listen the conversation without "overlaps" then the CRS simply playback each user's record in sequence from the first to the last record. The algorithm in this case is that subsequent record can start only when the preceding record is completed. Furthermore, when a user desires to listen to the teleconference, that user may transmit a request and receive the combined playback order information along with the local audio files shared to the host server 120 and generate an output/play of the teleconference by playing the audio segments from the local audio files in the order specified by the combined playback order information.

An example of a usage configuration is when a user is participating in the teleconference using their own mobile device or computer. However, the system also supports a configured where more than one user (as example one mobile is used in office and four people are speaking through it) is using the same audio device. In this example, the non-registered user will add in the application interface the names of additional participants (if they aren't registered users) and they will add an audio consent during the recording phase. For the local audio file where multiple users were declared to be using the same device, the host server 120, at playback time, may provide the possibility to include/exclude different speaker on the same local audio file, based on speech analysis or user preferences. In this case, a separate audio file is not generated for each of the plurality of local users, however, a filter may be used to filter out the owner and identify speech from the other users at the same device giving granularity on a local level as well.

The host server 120 receives local audio files from all local agents/users who have authorized participation. The host server 120 may construct a single audio playback order for segments of audio within each local audio file by synchronizing the audio segments from the local audio files in chronological order. The host server 120 may perform audio processing to create a single audio playback order/queue (i.e., combined speech from all received local audio files) based on timestamp data in the plurality of local audio files. The independently generated and combined local audio is clearer than traditional conference recording systems which record all speakers/users at the same time because the independently generated and combined audio is created from local recordings of single users (local audio files).

Another benefit of this system is that the host server 120 can generate an ordering of audio portions from the teleconference that is free of noise and overlaps by queuing sections of audio from the local audio files in chronological order such that a next audio portion does not start until a previous audio portion has finished. In other words, even if there is some overlap between two audio segments of two different users during the live teleconference, the host server 120 can see to it that there is no overlap when it generates the queue for playing back the audio. To do so, the host server 120 may modify an actual timing of an audio segment such that it does not overlap with an actual timing of a previous audio segment. In this example, each speech segment may be aligned with the next by the host server 120 so that there is no overlap. The host server 120 may also generate a precise transcript of the human voices on the teleconference which are converted to text. This is due to the recording of single voices on local devices which may then be combined subsequently at the host server 120.

Any of the audio devices 111-114 may request playback of the teleconference. For example, a local agent may receive the local audio files and play a combined teleconference audio based on the ordering received from the host server 120. Because the local audio files are generated independently and ordered by the host server 120, the local agent (or user thereof) can choose to mute a single user (or multiple users) during the playback of the teleconference by simply selecting the user via an interface (or a simple command). Accordingly, if there is confusion or the listener desires more clarity, the listener can mute one speaker when more than one speaker is talking.

Furthermore, the audio device 113 that participated in the teleconference but did not share their audio may still replay the teleconference audio. For example, the audio device may request the local audio files of the other users that did share their teleconference audio (i.e., audio devices 111, 112, and 114) and generate audio playback with their local data and with local data of other users who shared their data to be sent to the host server 120. Accordingly, any user that did not authorize their data to be sent to the host server 120 can request play-back from the host server 120. This non-consenting user (or the local agent on the user device) will receive only the audio files of the users that accepted/authorized their recording data to be sent to the host server 120. The local agent can use the timestamps to merge the audio files from the host server 120 with the local audio files (which were not uploaded to the central server) to re-build the conversation with correct chronology. To further enhance the re-build, the local agent can optionally request text files (speech-to-text) from the host server 120 to elaborate on the details of the conversation.

Figure 2:
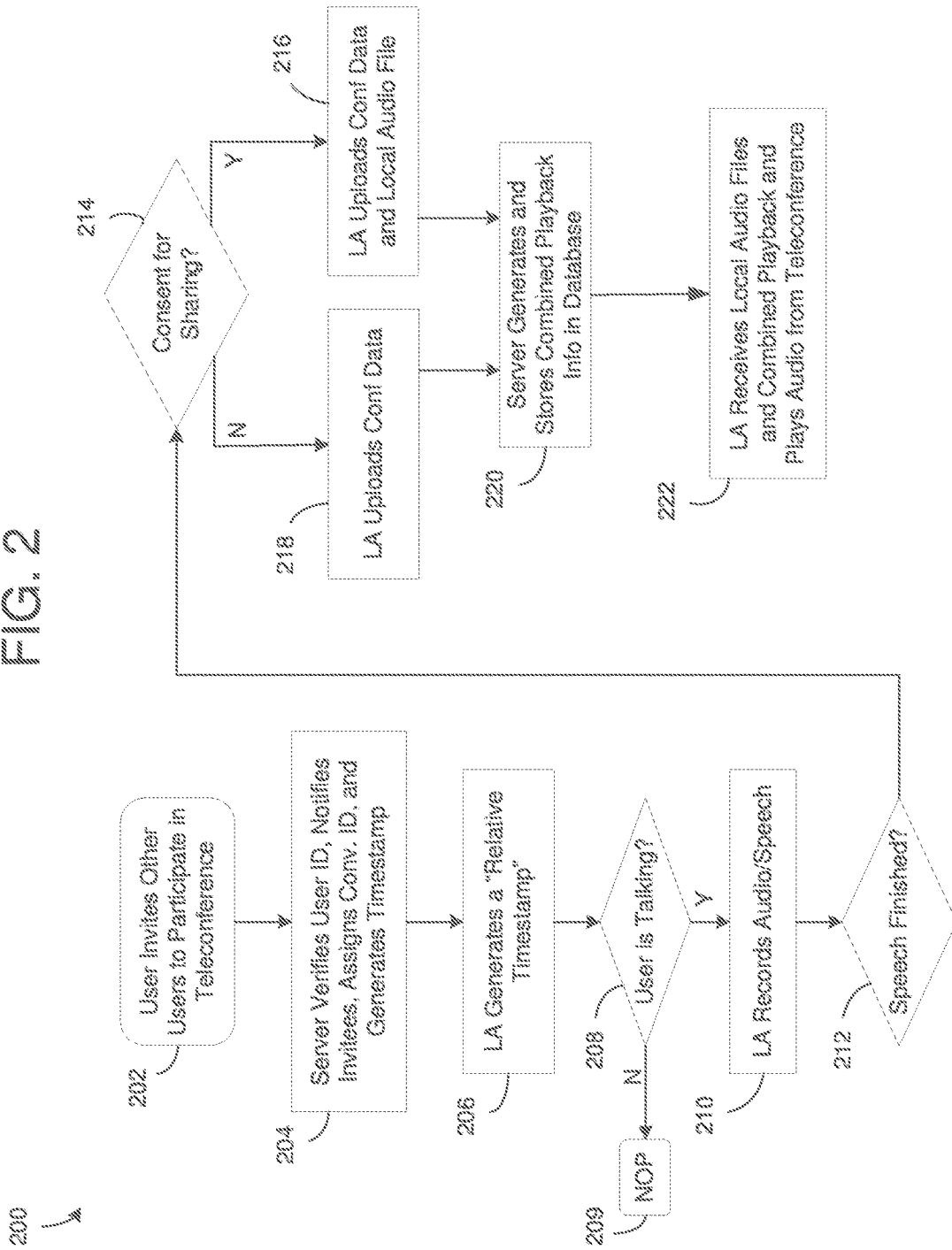
FIG. 2 is a diagram illustrating a teleconference recording process in accordance with an example embodiment.

FIG. 2 illustrates a teleconference recording process 200 in accordance with an example embodiment. The system described herein can be a standalone web application. As another example, the system can be integrated into an existing collaborative, Web meeting tool. The process 200 is performed by a host server (which may be referred to as a cognitive recording server) and a local agent of a user device. Prior to beginning the process 200 shown in FIG. 2, the system may be initiated with a registration phase. The audio devices may register with the central server and have the local agent installed therein as a result to ensure privacy and system access security. Each user may register with the system to participate in the teleconference system, perform voice record functionality, and control the access to the system. The application on the host server may provide an interface on audio devices that allows users to register their devices.

A recording session can be started by any user by an invitation or a call, in 202. The initiating user can optionally require other users to accept voice record, or he/she can set a threshold (percentage of participants) to start the voice record system. When the voice record system is active, the specific audio of a user conversation is always recorded by the local agent (LA) on the local device. In this way a user, who did not authorize the recording of his/her conversation can playback his/her conversation, in sync with the conversation of the other users that authorized the voice recording. Any user can allow or deny his own voice registration for the specific conversation, overwriting the default option provided at registration phase. In 204, the host server checks the identity of each user, and transmits the request to the invited people. The server may apply optional parameters like selective recording or a threshold, and assigns an identifier to the conversation. The host server generates a timestamp whenever a new conversation is started. This timestamp is sent to all audio devices involved in the teleconference.

In 206, the local agent installed on each audio device of the teleconference uses the timestamp provided by the server, to generate a "related timestamp". This mechanism is used to resolve the problem of date and time that could not be aligned in all devices. The conversation can now start. In 208, the local agent determines whether the user is speaking. If the user is not speaking, in 209, no operation is performed. However, when the local agent detects that a local user is speaking in 208, the local agent records each record (e.g., segment) of audio of the local user conversation and uses the "relative timestamp" to identify each record, in 210. Furthermore, the local agent may save each record with following attributes: conversation_id, user_id, relative_timestamp, audio file, and the like. When it is determined that the user has finished that portion of audio, in 212, the local agent determines whether the user thereof has authorized/consented to sharing of the local audio, in 214. Depending on whether the local user consented to sharing the audio will determine what is transmitted from the local agent to the host server. For example, when the local agent has been authorized to share the local audio file of the teleconference, in 216 the local agent saves/uploads the audio segment to the host server. Although, it is not necessary that each audio segment be uploaded individually. In another example, the entire audio file from the teleconference may be uploaded and the segments may be identified by the host server.

The local agent may loads the local object by sending the audio segment of the user from the teleconference to the host server with various information. Here, each audio segment may contain the audio recording. The actual data being uploaded may be conversation_id, user_id, relative_timestamp, audio file. Meanwhile, if the user has not consented to sharing audio from the teleconference, in 218, the local agent may only transmit the audio segment record identification information with the following form: conversation_id, user_id, relative_timestamp. In this example, the audio recording is not transmitted but just conference information which may be used by the host server to build the correct sequence of the conversation when a user requests a playback. However, when audio is not transmitted, the only identification of the user speaking during playback may be a muted silence.

The host server may record the voice files (mpeg, wav, etc.) into the database in the form of a blob, or the like, in 220. Each user may have their own record in the DB and each audio segment may be identified with a timestamp. Furthermore, the host server may generate ordered playback information for each of the audio segments from a teleconference involving multiple users based on a chronological order of the audio segments. The ordered playback information may be stored in the database in association with the conference ID, a user ID, or the like. In 222, any user can request a playback from the server. In response, the local agent on the user device may receive only the audio files of the users that accepted the conversation recording.

For example, if the local agent receives all local audio files that are part of the teleconference, in 222, the local agent can reproduce the audio from the teleconference based on the ordered playback information from the host server using audio segments from the received local audio files. However, if the local agent is of a user that did not consent to sharing their local audio file, the local agent may use the timestamps to merge the audio files returned from the server with a local audio file generated by the audio device. In this example, in 222, the local agent can re-build the conversation with the correct chronology based on the playback information from the host server using both the locally generated audio file and the one or more local audio files received from the host server. The local agent can optionally request a speech-to-text file generated by the server (e.g., in 220) for textual elaboration of the teleconference conversation content. In some embodiments, the application may include an application programming interface to make it easier for other software applications to retrieve the teleconference conversation data saved into the database.

FIG. 3A illustrates a process of modifying overlapping audio from a teleconference in accordance with an example embodiment. As shown in the conversation graph 300A of FIG. 3A, overlapping speech can occur during a teleconference involving multiple users such as user A, user B, and user C. In this example, the host server may generate audio playback information (i.e., a queued ordering) of each audio segment of the teleconference by combining/merging audio segments which are overlapping each other into an audio recording playback order that is non-overlapping as shown in the conversation graph 300B. As shown in graph 300B, the host server can adjust/modify a timing of an audio segment such that it does not start playing until a previous audio segment has finished playing. Furthermore, in some embodiments, the host server can add a small gap 301 between two audio segments to further enhance clarity of the teleconference audio and the transition between a first user speech and a second user speech.

Figure 3B:
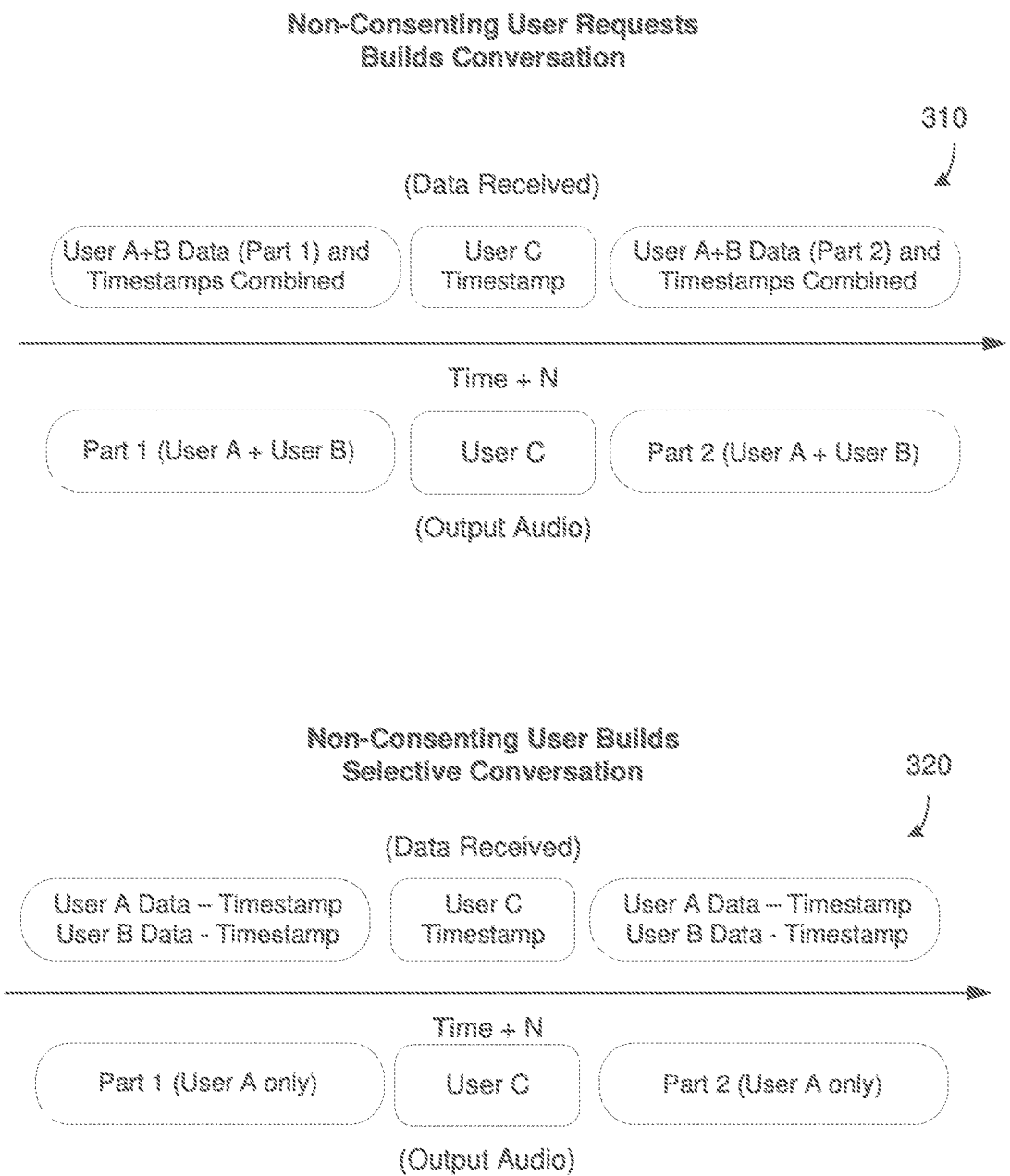
FIG. 3B is a diagram illustrating a process for building a conversation from a teleconference in accordance with an example embodiment.

FIG. 3B illustrates processes for building a conversation from a teleconference in accordance with an example embodiment. Referring to FIG. 3B, process 310 illustrates reconstruction of audio from all shared users (user A and user B) of a teleconference by a non-consenting user (user C) of the teleconference. In this example, the non-consenting user C has not uploaded their audio data but has instead merely uploaded timestamp data from a teleconference. Meanwhile, users A and B did opt to share their audio data from the central server. In this example, the user C desires to hear audio from all three of the users during the teleconference (users A, B, and C). In process 310, user C receives two audio files and timestamp information from both user A and user B. Here, the central server builds the conversation into two main files which are separated by a timestamp which corresponds to user C's audio data that was not provided. In this example, the audio device of user C receives the audio files and the timestamps of all the users and the local agent of the audio device builds the conversation using the audio files and timestamp data combined from user A, user B, and user C, and using the locally generated audio file of user C's speech.

Referring to FIG. 3B, process 320 illustrates reconstruction of selective audio from one of the shared users (user A) of a teleconference by a non-consenting user (user C) of the teleconference while selecting to remove speech from user B. In this example, the non-consenting user C has not uploaded their audio data but has instead merely uploaded timestamp data from a teleconference. Meanwhile, users A and B did opt to share their audio data from the central server. In this example, user C receives the local audio files of users A and B, and the timestamp information of each of users A, B, and C. Here, the local agent of the audio device being used by user C builds the conversation based on the timestamp data but selective turns OFF the audio of user B based on the timestamp information of user B.

FIG. 4 illustrates teleconference information stored in a database in accordance with an example embodiment. Once a conversation has been uploaded to the host server, the host server may perform a post-conversation audio processing on the audio from the teleconference and transcript the speech to text. The textual information may be added to the database in a related record such as shown in table 410. In this table 410, each audio segment includes a conversation ID, a user ID, a host server time 411, and a device time 412, as well as other data such as file types for audio and text data.

During this phase, the host server may apply user configured speech processing options to remove pieces of textual conversations that are not interesting in a business context. To perform this selection, the host system may use a dictionary that can be manually configured, and dynamically updated when an administrator removes a phrase from a conversation previously saved, thus being able to self-learn. The host server may also execute a configured keywords or key-phrases scan and store the captured phrase in the database using the keyword or the key-phrase as an indexed key for the database search. The captured words/phrases may be stored for a configurable length (number of characters), or for a specific amount of time (number of seconds) of speech. Table 420 shows an example of a DB records created when the keyword "deliver" is used along with any other words that include the keyword such as delivering, delivery, etc. In this example, a count 421 of the number of times the word is used and also the exact word 422 that is used. In this example, the keyword "deliver" is used as primary key for the database search operations, and each record is also identified with an id. The count column 421 contains a statistic of the number of times the "actual word" was used. In one configuration, the server can store the entire phrase when a word match is found, in another configuration the server can store only a fixed number of characters following the key word.

FIG. 5 illustrates a method 500 of generating audio playback information for a teleconference in accordance with an example embodiment. For example, the method 500 may be performed by a computing device such as a server (e.g., host server 120 in FIG. 1), a cloud platform, a workstation computer, a user device, and the like. In 510, the method includes receiving a plurality of local audio files from a plurality of audio devices that participated in a teleconference. Each local audio file may include an audio recording that is captured locally of a user of a respective audio device during a teleconference with other users corresponding to the other audio devices among the plurality of audio devices. For example, each audio device may transmit a device ID/user ID, a conversation ID, an audio file, timestamp data, and the like. In some embodiments, each audio device may generate its respective local audio file of the teleconference using a filter that can filter out noise, speech, etc. from other users except a local user (e.g., owner, etc.) of the audio device thereby enhancing the quality of the audio recorded of the local user.

In 520, the method includes generating combined audio playback information for the teleconference based on the plurality of local audio files received from the plurality of audio devices. For example, the generating may include identifying audio portions within the plurality of local audio files which are detected by a local agent or detected by the host server and synchronizing a playing order of the detected audio portions based on timing information included in the plurality of local audio files. The host server may intermingle sections of audio from each of the local audio files based on a chronological order in which the sections of audio were spoken during the teleconference. Also, each section of audio can be associated with a user ID/device ID thereby associating the section of audio with its local audio file.

In some embodiments, the synchronizing may include queuing the detected audio portions from the plurality of local audio files in chronological order based on the timing information to prevent the detected audio portions from overlapping during audio playback. In this example, the queuing may include queuing a first chronologically detected audio portion from a first local audio file to begin playback, and queuing a next chronologically detected audio portion to begin playback only after playing of the first chronologically detected audio portion has ended. In some embodiments, the synchronizing may further include modifying a timing of a playback of a second audio portion that overlaps with a playback of a first audio portion such that when played the second audio portion no longer overlaps the first audio portion. For example, the second audio portion may be moved back in time and/or the first audio portion may be moved forward in time (with respect to a playing time of the audio of the teleconference). Accordingly, an audio space (e.g., silence) may be placed between each portion of audio within the teleconference to enhance the clarity and remove noise from the audio.

In 530, the method includes transmitting the combined audio playback information of the teleconference to at least one audio device among the plurality of audio devices. For example, the host server may transmit the combined audio playback information along with the local audio files to an audio device that desires to listen to a playback/recording of the teleconference. Here, the audio device may determine portions of audio from each local audio file to be played, an order/queue for each of the portions (e.g., such that no overlaps occur), and the like, based on the combined audio playback information. The audio device may also extract the audio portions from the local audio files based on user ID information included in the combined audio playback information.

Although not shown in FIG. 5, in some embodiments, the method may include transmitting a timestamp to each of the plurality of audio devices participating in the teleconference at a start of the teleconference. Here, the timestamp can be used by each of the plurality of audio devices to generate the plurality of local audio files making the synchronization process easier on the central host server because each audio device will have a same start time provided by the server rather than using a local clock of each audio device which may differ from each other.

In some embodiments, the method may further include receiving authorization from a respective audio device for use of a respective local audio file prior to generating the combined audio playback information. In this case, only consenting users may provide audio to the host server while non-consenting users may hold onto their local audio file. In some embodiments, the method may further include converting speech from the plurality of local audio files to text, merging the converted text into chronological order to generate a single combined text file, and outputting the single combined text file along with the combined audio playback information. The text file can be helpful to a user listing to the combined audio because it can provide additional clarity. In some embodiments, the method may further include performing post-conversation processing on the converted text to remove words that are not of interest when generating the single combined text file to make the text easier and more compact to read.

The above embodiments may be implemented in hardware, in a computer program executed by a processor, in firmware, or in a combination. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
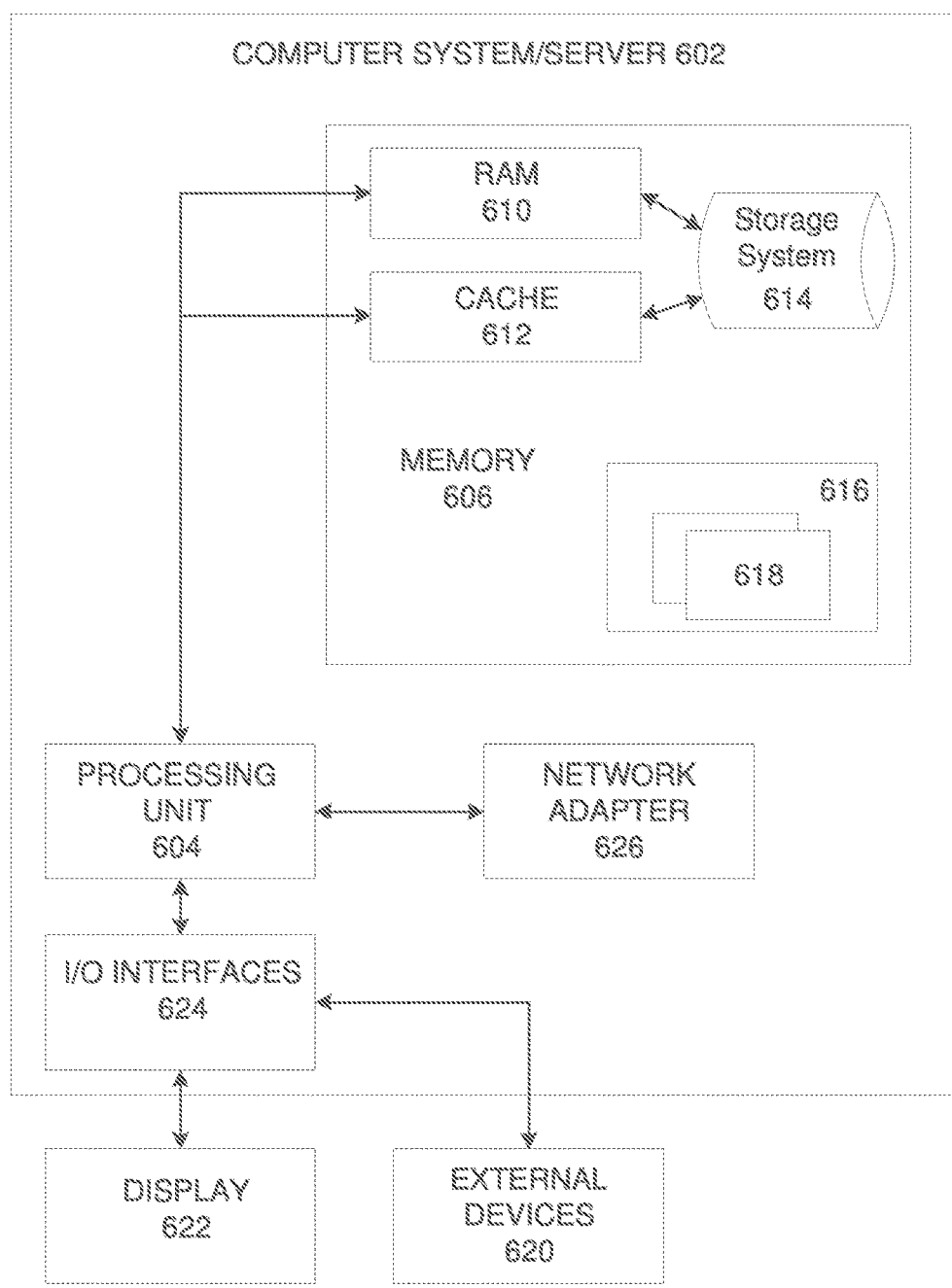
FIG. 6 is a diagram illustrating a computing system in accordance with an example embodiment.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc. The computer system 600 may be a single device or a combination of devices. For example, the computer system 600 may be a blockchain node, a database, a server, a cloud platform, a network, a combination thereof, and the like.

FIG. 6 is not intended to suggest any limitation as to the scope of use or functionality of embodiments of the application described herein. Regardless, the computing system 600 (or node 600) is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in computing node 600 is shown in the form of a general-purpose computing device. The components of computer system/server 602 may include, but are not limited to, one or more processors or processing units 604 (i.e., processors), a system memory 606, and a bus that couples various system components including system memory 606 to processor 604. The computing node 600 may be the host server 120 or one of the audio devices shown in FIG. 1. Also, the computing node 600 may be another device or combination of devices such as a server, cloud platform, database, and/or the like. Also, the computing node 600 may perform the method 500 shown in FIG. 5.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626 (also referred to as a network interface). As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

According to various embodiments, the network interface 626 may receive a plurality of local audio files from a plurality of audio devices that participated in a teleconference. The processor 606 may generate combined audio playback information for the teleconference based on the plurality of local audio files received from the plurality of audio devices by detecting audio portions within the plurality of local audio files and synchronizing a playing order of the detected audio portions based on timing information included in the plurality of local audio files. The processor 606 may further control the network interface 626 to transmit the combined audio playback information of the teleconference to at least one audio device among the plurality of audio devices.

In some embodiments, the processor 606 may queue the detected audio portions from the plurality of local audio files in chronological order based on the timing information to prevent the detected audio portions from overlapping during audio playback. Furthermore, the processor 606 may modify a timing of a playback of a second audio portion that overlaps with a playback of a first audio portion such that when played the second audio portion no longer overlaps the first audio portion. Prior to generating the audio playback information, the processor 606 may receive an authorization from a respective audio device for use of a respective local audio file prior to generating the combined audio playback information and only receive audio from consenting audio devices while not receiving audio from non-consenting audio devices that participated in the teleconference. As another example, the processor 606 may control the network interface 626 to transmit a timestamp to each of the plurality of audio devices participating in the teleconference at a start of the teleconference to be used by each the plurality of audio devices to generate the plurality of local audio files.

In some embodiments, the processor 606 may convert speech from the plurality of local audio files to text, merge the converted text into chronological order to generate a single combined text file, and control the network interface 626 to transmit the combined text file along with the combined audio playback information. In this example, the processor 606 may further perform post-conversation processing on the converted text to remove words that are not of interest when generating the single combined text file.

In one or more other embodiments, the processor 606 may generate a local audio file including audio captured of a user of an audio device while participating in a teleconference. In this example, the network interface 626 may receive one or more other local audio files of the teleconference captured by one or more other audio devices that participated in the teleconference. In this example, each received local audio file may include detected audio portions and timing information of the detected audio portions. The processor 606 may also determine a synchronized playback order for audio portions of the generated local audio file and the detected audio portions of the one or more received local audio files based on timing information included in the generated local audio file and the received timing information. Also, the processor 606 may output the audio portions of the generated local audio file and the detected audio portions of the one or more received local audio files synchronized together based on the determined synchronized playback order.

Figure 7:
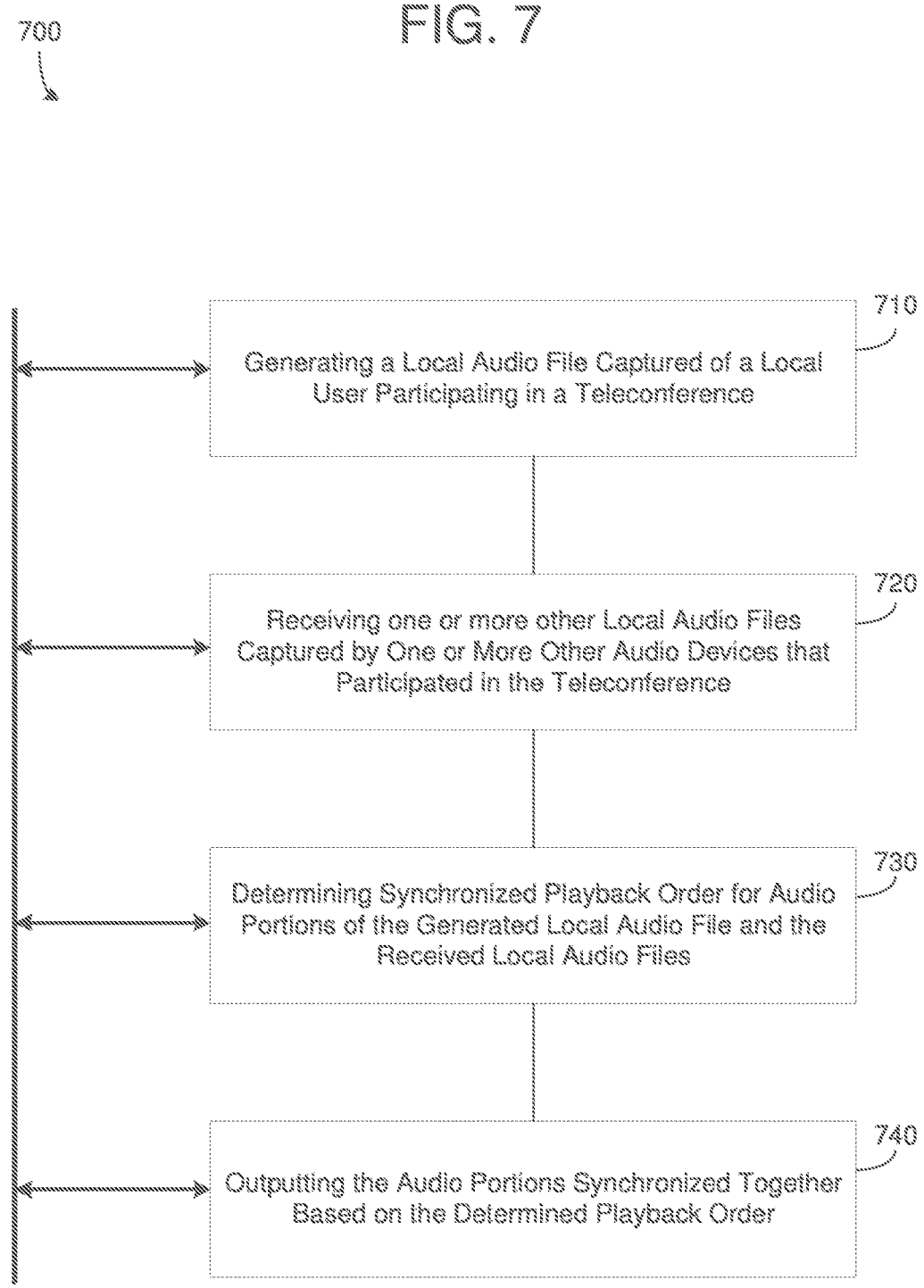
FIG. 7 is a diagram illustrating a method of locally playing audio from a teleconference in accordance with an example embodiment.

FIG. 7 illustrates a method 700 of generating audio playback information for a teleconference in accordance with an example embodiment. For example, the method 500 may be performed by an audio computing device having a local agent installed therein such as a smart phone, a computer/headset, a tablet, a video phone, a workstation computer, a kiosk, and the like. In 710, the method includes generating a local audio file that includes audio captured of a user of an audio device while participating in a teleconference. For example, a local agent may capture audio of a user (or multiple users) of an audio device such as a smartphone, video phone, etc., and generate an audio file of speech of the local user participating the teleconference while filtering out other speech, noise, etc., from other users that are not using the local device but are instead participating in the teleconference via another device.

In 720, the method includes receiving one or more other local audio files of the teleconference captured by one or more other audio devices that participated in the teleconference. The received local audio files may be captured locally by other audio devices of other users participating in the common teleconference. The received local audio files may be transmitted from a central server that detects audio portions and timing information of the detected audio portions from within each of the local audio files. For example, each received local audio file may include a user identification associated with an audio device that generated the local audio file, a conference identification of the teleconference associated with the audio file, timing information, and an audio recording captured by the audio device during the teleconference.

In 730, the method includes determining a synchronized playback order for audio portions of the generated local audio file and the detected audio portions of the one or more received local audio files based on timing information (e.g., playback information) included in the generated local audio file and the received timing information. In addition, in 740, the method includes outputting, via the audio device, the audio portions of the generated local audio file and the detected audio portions of the one or more received local audio files synchronized together based on the determined synchronized playback order.

According to various embodiments, the locally generated audio file may be generated for a user that did not consent in sharing their audio file from the teleconference. Meanwhile, the received audio files may be captured of other users of the teleconference that did agree/consent to sharing their audio from the teleconference. In addition to receiving the audio files, the host server may transmit playback information which queues playing of audio portions detected from each of the local audio files in chronological order. In this example, the audio device performing the method 700 may selectively mute one or more users from among the plurality of other users that participated in the teleconference by preventing playback of a corresponding local audio file of the selected user, in response to receiving a mute request identifying the user. For example, the mute request may be input through a keypad or other input device associated with the local audio device.

In some embodiments, the method may further include receiving a timestamp from the central host server which is transmitted to all user/audio devices that participate in the teleconference, and generating the local audio file based on the timestamp received. In some embodiments, the method may further include receiving a combined text file including speech from the one or more received local audios files which has been converted to text and synchronized by a host server. In some embodiments, the method may further include filtering out sound (e.g., speech, noise, etc.) of other users that participated in the teleconference when generating the local audio file such that a clarity of speech provided by the user of the audio device is more recognizable.

Figure 8:
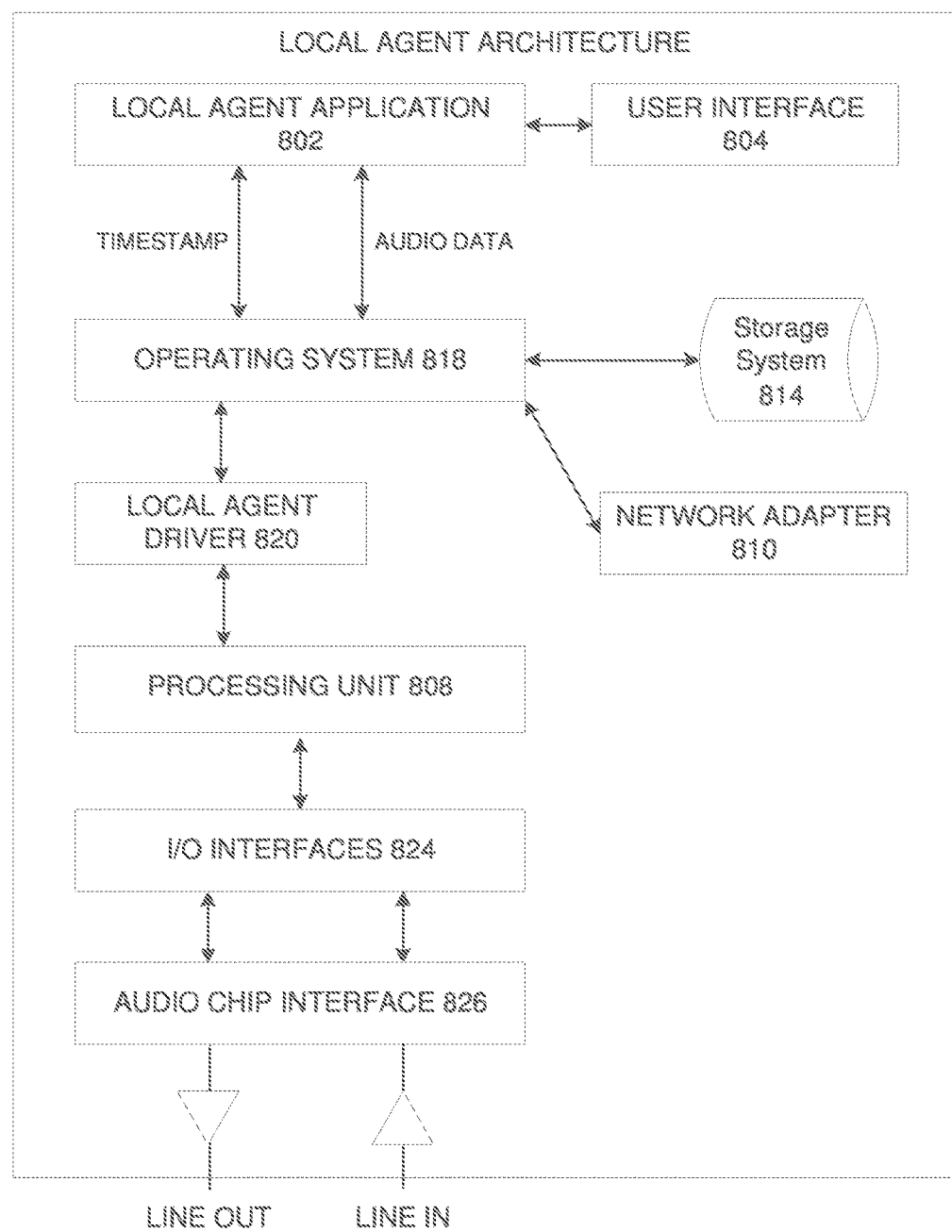
FIG. 8 is a diagram illustrating an architecture of an audio device configured with a local agent in accordance with an example embodiment.

FIG. 8 illustrates an architecture 800 of an audio device configured with a local agent in accordance with an example embodiment. Referring to FIG. 8, the local agent architecture 800 includes a local agent application 802 which may be installed on an audio device and controlled by a processor 808. The local agent application 802 may communicate with a local agent driver 820 that is installed via an operating system 818 of the audio device, and which receives audio data detected by an audio chip interface 824. For example, a line in and a line out may be connected to the audio chip interface for receiving and outputting audio data, respectively. According to various aspects, the local agent application 802 may control the audio chip interface 824 to record audio data of a local user during a teleconference. The audio data may be transferred between the audio chip interface 826 and an I/O interface 824, under control of the processor 808 which may control the overall operations of the components within the architecture 800. The local agent application 802 can interact with the audio chip interface 826 to record audio data of a user of the device to generate a local audio file. Timestamp information may also be generated by the local agent application 802 and stored with the local audio file within the storage 814. In addition, the local audio file and the timestamp data can be transmitted to a central server via the network adapter 810. The local agent application 802 can also output a user interface 804 which can provide a user with the ability to selectively turn ON and OFF the speech of users in the teleconference.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

The invention claimed is:

1. A computing system, comprising:
a processor configured to generate a local audio file comprising audio captured of a user of an audio device that participates in a teleconference, the audio being captured by a local agent that prevents recording of non-local participants during the teleconference; and
a network interface configured to receive one or more other local audio files of the teleconference captured by one or more other audio devices that participated in the teleconference, each received local audio file comprising detected audio portions and timing information of the detected audio portions captured by other respective local agents that prevent recording of non-local participants during the teleconference,
wherein the processor is further configured to determine a synchronized playback order for audio portions of the generated local audio file and the detected audio portions of the one or more received local audio files based on timing information included in the generated local audio file and the received timing information, and
output a playback of the audio portions of the generated local audio file and the detected audio portions of the one or more received local audio files synchronized together based on the determined synchronized playback order.

2. The computing system of claim 1, wherein the one or more received local audio files are received from a host server, and each received local audio file comprises a user identification associated with an audio device that generated the local audio file, a conference identification, timing information, and an audio recording captured by the audio device during the teleconference.

3. The computing system of claim 1, wherein the one or more received local audio files comprise a plurality of local audio files corresponding to a plurality of other users that participated in the teleconference and that consented to sharing their audio file with other users of the teleconference.

4. The computing system of claim 3, wherein the processor is further configured to selectively mute a user from among the plurality of other users that participated in the teleconference by preventing playback of a corresponding local audio file of the selected user, in response to receiving a mute request identifying the user.

5. The computing system of claim 3, wherein the generated local audio file is captured of a user that did not consent to sharing their audio file with other users of the teleconference and is not shared with the plurality of other users that participated in the teleconference.

6. The computing system of claim 1, wherein the network interface is further configured to receive a timestamp from a host server which is transmitted to all user devices that participate in the teleconference, and the processor is configured to generate the local audio file based on the timestamp received.

7. The computing system of claim 1, wherein the network interface is further configured to receive a combined text file including speech from the one or more received local audios files which has been converted to text and synchronized by a host server.

8. The computing system of claim 1, wherein the processor, via the local agent, is configured to recognize and record sound of the local user and not record sound of other users during the teleconference when generating the local audio file such that a clarity of speech provided by the user of the audio device is more recognizable.

9. A computer-implemented method, comprising:
generating a local audio file comprising audio captured of a user of an audio device while participating in a teleconference, the audio being captured by a local agent that prevents recording of non-local participants during the teleconference;
receiving one or more other local audio files of the teleconference captured by one or more other audio devices that participated in the teleconference, each received local audio file comprising detected audio portions and timing information of the detected audio portions captured by other respective local agents that prevent recording of non-local participants during the teleconference;
determining a synchronized playback order for audio portions of the generated local audio file and the detected audio portions of the one or more received local audio files based on timing information included in the generated local audio file and the received timing information; and
outputting, via the audio device, a playback of the audio portions of the generated local audio file and the detected audio portions of the one or more received local audio files synchronized together based on the determined synchronized playback order.

10. The computer-implemented method of claim 9, wherein the one or more received local audio files are received from a host server, and each received local audio file comprises a user identification associated with an audio device that generated the local audio file, a conference identification, timing information, and an audio recording captured by the audio device during the teleconference.

11. The computer-implemented method of claim 9, wherein the one or more received local audio files comprise a plurality of local audio files corresponding to a plurality of other users that participated in the teleconference and that consented to sharing their audio file with other users of the teleconference.

12. The computer-implemented method of claim 11, further comprising selectively muting a user from among the plurality of other users that participated in the teleconference by preventing playback of a corresponding local audio file of the selected user, in response to receiving a mute request identifying the user.

13. The computer-implemented method of claim 11, wherein the generated local audio file is captured of a user that did not consent to sharing their audio file with other users of the teleconference and is not shared with the plurality of other users that participated in the teleconference.

14. The computer-implemented method of claim 9, further comprising receiving a timestamp from a host server which is transmitted to all user devices that participate in the teleconference, and generating the local audio file based on the timestamp received.

15. The computer-implemented method of claim 9, further comprising receiving a combined text file including speech from the one or more received local audios files which has been converted to text and synchronized by a host server.

16. The computer-implemented method of claim 9, wherein the generating, via the local agent, comprises recognizing and recording sound of the local user while not recording sound of other users during the teleconference when generating the local audio file such that a clarity of speech provided by the user of the audio device is more recognizable.

17. A non-transitory computer readable medium having stored therein program instructions that when executed cause a computer to perform a method comprising:

generating a local audio file comprising audio captured of a user of an audio device while participating in a teleconference, the audio being captured by a local agent that prevents recording of non-local participants during the teleconference;

receiving one or more other local audio files of the teleconference captured by one or more other audio devices that participated in the teleconference, each received local audio file comprising detected audio portions and timing information of the detected audio portions captured by other respective local agents that prevent recording of non-local participants during the teleconference;

determining a synchronized playback order for audio portions of the generated local audio file and the detected audio portions of the one or more received local audio files based on timing information included in the generated local audio file and the received timing information; and outputting, via the audio device, a playback of the audio portions of the generated local audio file and the detected audio portions of the one or more received local audio files synchronized together based on the determined synchronized playback order.

18. The non-transitory computer readable medium of claim 17, wherein the one or more received local audio files are received from a host server, and each received local audio file comprises a user identification associated with an audio device that generated the local audio file, a conference identification, timing information, and an audio recording captured by the audio device during the teleconference.

19. The non-transitory computer readable medium of claim 17, wherein the one or more received local audio files comprise a plurality of local audio files corresponding to a plurality of other users that participated in the teleconference and that consented to sharing their audio file with other users of the teleconference.

20. The non-transitory computer readable medium of claim 19, wherein the method further comprises selectively muting a user from among the plurality of other users that participated in the teleconference by preventing playback of a corresponding local audio file of the selected user, in response to receiving a mute request identifying the user.

* * * * *